(12) United States Patent
Choi

(10) Patent No.: US 9,775,305 B2
(45) Date of Patent: Oct. 3, 2017

(54) METHOD FOR CONTROLLING LAND SURFACE TEMPERATURE USING STRATOSPHERIC AIRSHIPS AND REFLECTOR

(71) Applicant: KOREA AEROSPACE RESEARCH INSTITUTE, Daejeon (KR)

(72) Inventor: Joon-Min Choi, Daejeon (KR)

(73) Assignee: KOREA AEROSPACE RESEARCH INSTITUTE, Daejeon (KR)

( * ) Notice: Subject to any disclaimer, the term of this patent is extended or adjusted under 35 U.S.C. 154(b) by 21 days.

(21) Appl. No.: 15/011,359

(22) Filed: Jan. 29, 2016

(65) Prior Publication Data

US 2016/0219800 A1 Aug. 4, 2016

Related U.S. Application Data

(63) Continuation-in-part of application No. 14/002,714, filed as application No. PCT/KR2012/008642 on Oct. 22, 2012, now abandoned.

(30) Foreign Application Priority Data

Nov. 21, 2011 (KR) .......... 10-2011-0121491

(51) Int. Cl.
*G02B 26/02* (2006.01)
*A01G 15/00* (2006.01)
(Continued)

(52) U.S. Cl.
CPC .............. *A01G 15/00* (2013.01); *A45B 23/00* (2013.01); *B64B 1/00* (2013.01); *F24J 2/10* (2013.01);
(Continued)

(58) Field of Classification Search
CPC ........ A01G 15/00; F24J 2/10; G02B 19/0019; G02B 7/18; G02B 7/183; G02B 5/09;
(Continued)

(56) References Cited

U.S. PATENT DOCUMENTS 4,281,427 A * 8/1981 Petters ................. H01Q 1/1292
116/210
4,974,655 A * 12/1990 Teachout ............... B60J 1/2091
160/370.23

(Continued)

FOREIGN PATENT DOCUMENTS

JP 2004-266929 A 9/2004

OTHER PUBLICATIONS

Radford, Tim, "Reducing Sunlight by Geoengineering Will Not Cool Earth", Dec. 27, 2013, Climate Central, http://www.climatecentral.org/news/reducing-sunlight-by-geoengineering-will-not-cool-earth-16861.

(Continued)

*Primary Examiner* — William R Alexander
(74) *Attorney, Agent, or Firm* — Rabin & Berdo, P.C.

(57) ABSTRACT

The present invention relates to a method for controlling land surface temperature using stratospheric airships and a reflector. In the method for controlling land surface temperature using stratospheric airships and a reflector, four corners are connected to a lower end of support lines coupled to be disposed vertically downward from a plurality of airships, and sunlight is reflected by a reflector unfolded into a tetragonal shape in the air, wherein the reflecting surface of the reflector plate is maintained at an angle to remain perpendicular to an incident angle of sunlight to shield, or redirect, the land surface from incident sunlight.

14 Claims, 11 Drawing Sheets

(51) Int. Cl.
*G02B 7/183* (2006.01)
*G02B 19/00* (2006.01)
*F24J 2/10* (2006.01)
*A45B 23/00* (2006.01)
*G02B 7/00* (2006.01)
*G02B 7/18* (2006.01)
*G02B 5/08* (2006.01)
*G02B 5/09* (2006.01)
*B64B 1/00* (2006.01)

(52) U.S. Cl.
CPC ............... *G02B 5/08* (2013.01); *G02B 5/09* (2013.01); *G02B 7/00* (2013.01); *G02B 7/18* (2013.01); *G02B 7/183* (2013.01); *G02B 19/00* (2013.01); *G02B 19/0019* (2013.01); *G02B 19/0042* (2013.01); *G02B 26/02* (2013.01); *A45B 2023/0093* (2013.01)

(58) Field of Classification Search
CPC . G02B 5/08; G02B 7/00; G02B 19/00; G02B 19/0042; G02B 26/02; A45B 23/00; A45B 2023/0093; B64B 1/00
USPC ......... 165/45, 48.2; 359/838, 850, 853, 871; 244/30, 24
See application file for complete search history.

(56) References Cited

U.S. PATENT DOCUMENTS

| | | | | |
|---|---|---|---|---|
| 5,061,929 A * | 10/1991 | Bell | ............... | H01Q 15/20 342/10 |
| 5,404,868 A * | 4/1995 | Sankrithi | ............... | F24J 2/1052 126/604 |
| 6,119,986 A | 9/2000 | Stribling, Jr. | | |
| 6,135,191 A * | 10/2000 | Mitchell | ............... | B60J 1/2011 160/134 |
| 6,237,241 B1 * | 5/2001 | Aaron | ............... | B25J 17/0266 33/268 |
| 6,571,815 B1 * | 6/2003 | Hill | ............... | E04H 15/58 135/117 |
| 8,267,348 B2 * | 9/2012 | Alavi | ............... | B64B 1/60 244/30 |
| 2004/0065773 A1 | 4/2004 | Morales | | |
| 2004/0165290 A1 * | 8/2004 | Muscat | ............... | E04D 13/103 359/850 |
| 2006/0049305 A1 | 3/2006 | Porter | | |
| 2007/0034740 A1 * | 2/2007 | Li | ............... | B64B 1/04 244/30 |
| 2008/0030884 A1 | 2/2008 | Hershkovitz | | |
| 2009/0032214 A1 | 2/2009 | Hucko | | |
| 2009/0230236 A1 * | 9/2009 | Tillotson | ............... | B64B 1/06 244/30 |
| 2009/0230237 A1 * | 9/2009 | Tillotson | ............... | F24J 2/38 244/30 |
| 2009/0272841 A1 | 11/2009 | Sinsabaugh et al. | | |
| 2009/0283630 A1 * | 11/2009 | Al-Garni | ............... | A45B 23/00 244/30 |
| 2009/0299551 A1 | 12/2009 | So et al. | | |
| 2010/0229850 A1 * | 9/2010 | Sankrithi | ............... | F24J 2/1052 126/601 |
| 2010/0252027 A1 * | 10/2010 | Sankrithi | ............... | F24J 2/1052 126/604 |
| 2011/0277815 A1 * | 11/2011 | Sankrithi | ............... | F24J 2/14 136/246 |
| 2011/0315811 A1 * | 12/2011 | Al-Garni | ............... | A45B 23/00 244/30 |
| 2012/0069464 A1 * | 3/2012 | Murakami | ............... | A45B 3/02 359/849 |
| 2014/0158823 A1 * | 6/2014 | Smith | ............... | B64B 1/44 244/1 A |
| 2014/0322094 A1 | 10/2014 | Wang et al. | | |
| 2015/0116485 A1 * | 4/2015 | Revankar | ............... | A45B 23/00 348/135 |
| 2015/0359184 A1 * | 12/2015 | Goelet | ............... | B64B 1/06 244/30 |

OTHER PUBLICATIONS

Kleidon, A. & Renner, M., (2013)"A simple explanation for the sensitivity of the hydrologic cycle to surface temperature and solar radiation and its implications for global climate change", Earth Syst. Dynam. 4 (2), S. 455-465. DOI: 1 0.5194/esd-4-455-2013. http://www.earth-syst-dynam.net/4/455/2013/esd-4-455-2013.pdf.

European Patent Office. Search Report for corresponding application EP 12 85 1053.4. Oct. 27, 2015.

Ole Humlum. Climate4You. Climate and Clouds. Accessed on Jan. 29, 2016. http://www.climate4you.com/ClimateAndClouds.htm.

* cited by examiner

METHOD FOR CONTROLLING LAND SURFACE TEMPERATURE USING STRATOSPHERIC AIRSHIPS AND REFLECTOR

This is a continuation-in-part of application Ser. No. 14/002,714, filed on Sep. 13, 2013, which claims the benefits of a 371 International application Serial No. PCT/KR2012/008642, filed on Oct. 22, 2012, and Korean application Serial No. 10-2011-0121491, filed on Nov. 21, 2011, the subject matters of which are incorporated herein by reference.

TECHNICAL FIELD

The present invention relates to a method of controlling a land surface temperature using stratospheric airships and a reflector, and more specifically to a method of controlling a land surface temperature using stratospheric airships and a reflector, in which a large reflector is installed in the stratospheric airships and blocks or reflects sunlight to freely control the temperature, for example, to locally increase or decrease temperature in a predetermined area.

BACKGROUND ART

As global warming has recently been accelerated, glaciers and permanent snow maintaining more than 70% of fresh water existing on the earth are continuously melting.

If the glaciers and the permanent snow are melting, the fresh water is carried away and the sea level rises, thereby causing countries adjacent to the seashore to sink in seawater. In the long term, change in salinity of seawater may destroy the aquatic ecosystem of the sea.

To solve such a problem that the glaciers or the permanent snow are gradually melting due to global warming, climatic environments have to be fundamentally changed. However, time and efforts are too long and too much to change the fundamental climatic environments through human endeavor.

Recently, there has been proposed a method of protecting the glaciers and the permanent snow by lowering temperature in a predetermined area as sunlight exposed in the air is artificially blocked to control a large amount of sunlight beating down on a predetermined area.

Representatively, US patent publication No. 2009/0032214, titled "SYSTEM AND METHOD OF CONTROL OF THE TERRESTRIAL CLIMATE AND ITS PROTECTION AGAINST WARMING AND CLIMATIC CATASTROPHES CAUSED BY WARMING SUCH AS HURRICANES", discloses a method of blocking sunlight in a predetermined area, in which an airplane generates exhaust gas such as volcanic ash to thereby make atmospheric environments such as mini nuclear winter.

Although such a sunlight blocking method is easily applied to a relatively large area, the exhaust gas may remain in the air and move to another area by a convection current, thereby causing serious air pollution. Further, in a predetermined area, this method is difficult to keep a sunlight blocking condition to last for a long time.

Also, US patent publication No. 2008/0030884, titled "DEVICE AND METHOD FOR AFFECTING LOCAL CLIMATIC PARAMETERS", discloses a method of blocking sunlight in a predetermined area, in which an unmanned aerial vehicle equipped with a sunlight reflector is aviated.

However, such a sunlight blocking method may have problems that exhaust gas of the unmanned aerial vehicle influences atmospheric contamination and unstable atmosphere in the troposphere makes it difficult to position the unmanned aerial vehicle. Also, the unmanned aerial vehicle needs periodical refueling and maintenance, and is hard to stay for a long time in the troposphere.

Further, as shown in FIG. 1, the reflector installed in the unmanned aerial vehicle maintains level with a land surface in the troposphere, so that it is thus difficult to effectively block the sunlight beating down on the land surface at a predetermined angle. Therefore, the blocked area is not optimized.

DISCLOSURE

Technical Problem

The present invention is conceived to solve the foregoing problems, and an aspect of the present invention is to provide a method of controlling a land surface temperature using stratospheric airships and a reflector, in which a large reflector is installed in the stratospheric airships and blocks or reflects sunlight in the stratosphere to decrease temperature in a predetermined area, so that the glaciers or the permanent snow can be prevented from melting due to global warming and the fresh water can be prevented from being carried away without environmental contamination.

Also, another aspect of the present invention is to provide a method of controlling a land surface temperature using stratospheric airships and a reflector, in which the number and angle of large reflectors installed in the stratospheric airships are properly controlled, so that the large reflector in the stratosphere can reflect sunlight to increase temperature in a predetermined area, thereby having a temperature proper to a human's living condition at intense cold or cold wave due to abnormal climate.

Technical Solution

In accordance with one aspect of the present invention, there is provided a method of controlling a land surface temperature using stratospheric airships and a reflector by reflecting sunlight from a reflector that has four corners connected to lower ends of support lines coupled to a plurality of airships in a vertically downward direction and is tetragonally unfolded in the air, wherein a reflecting surface of the reflector is inclined and maintained at an angle perpendicular to an incident angle of the sunlight so as to block the sunlight introduced onto a land surface.

The airship may be located in the stratosphere, move from the land surface to the stratosphere in the state that the reflector is folded, and is positioned in the stratosphere so that the reflector is unfolded to have a reflecting surface perpendicular to an incident angle of the sunlight.

The airship may be controlled to have a posture through a propelling system, and includes a solar cell to get propelling power and a fuel cell for an auxiliary power supply.

The reflector may include fabric made of nylon or polyester, and includes at least one surface between both surfaces thereof coated with a material for reflecting sunlight.

A plurality of reflectors may be grouped by a plurality of airships so that the area of the land surface, in which the sunlight is blocked, is increased.

The support line may include a wire.

In accordance with one aspect of the present invention, there is provided a method of controlling a land surface temperature using stratospheric airships and a reflector by reflecting sunlight from a reflector that has four corners connected to lower ends of support lines coupled to a plurality of airships in a vertically downward direction and is unfolded in echelon in the air, wherein a reflecting surface of the reflector is inclined and maintained to form an obtuse angle to an incident angle of the sunlight so as to introduce more reflected light of the sunlight into a land surface of a certain area.

The reflector may introduce more sunlight into the land surface of the certain area by adjusting an angle of the reflecting surface to an incident angle of the sunlight as the airships supporting corners of opposite long and short sides of the reflector are moved and positioned.

An inclination angle of the reflector may be controlled with respect to the incident angle of the sunlight as a pair of airships supporting the corners of the short side intersectionally moves between a pair of airships supporting the corners of the long side.

An inclination angle of the reflector may be controlled with respect to the incident angle of the sunlight as a pair of airships supporting the corners of the long side intersectionally moves from an outside of a pair of airships supporting the corners of the short side.

A plurality of reflectors may be grouped at different angles in a longitudinal direction with respect to an incident direction of the sunlight, and a distance between front and back neighboring reflectors may be set up so that the reflected light of the back reflector cannot be blocked by the front reflector.

A plurality of reflectors may be grouped at different angles in a transverse direction with respect to an incident direction of the sunlight.

Advantageous Effects

In accordance with an aspect of the present invention, there is provided a method of controlling a land surface temperature using stratospheric airships and a reflector, in which a large reflector is installed in the stratospheric airships and blocks or reflects sunlight in the stratosphere to decrease temperature in a predetermined area, so that the glaciers or the permanent snow can be prevented from melting due to global warming and the fresh water can be prevented from being carried away without environmental contamination.

In accordance with another aspect of the present invention, there is also provided a method of controlling a land surface temperature using stratospheric airships and a reflector, in which the number and angle of large reflectors installed in the stratospheric airships are properly controlled, so that the large reflector in the stratosphere can reflect sunlight to increase temperature in a predetermined area, thereby having a temperature proper to a human's living condition at intense cold or cold wave due to abnormal climate.

BEST MODE

The foregoing aspects about technical configuration and operative effects in a method of controlling a land surface temperature using stratospheric airships and a reflector according to an embodiment of the present invention will be clearly appreciated by the following descriptions with reference to accompanying drawings.

Figure 1:
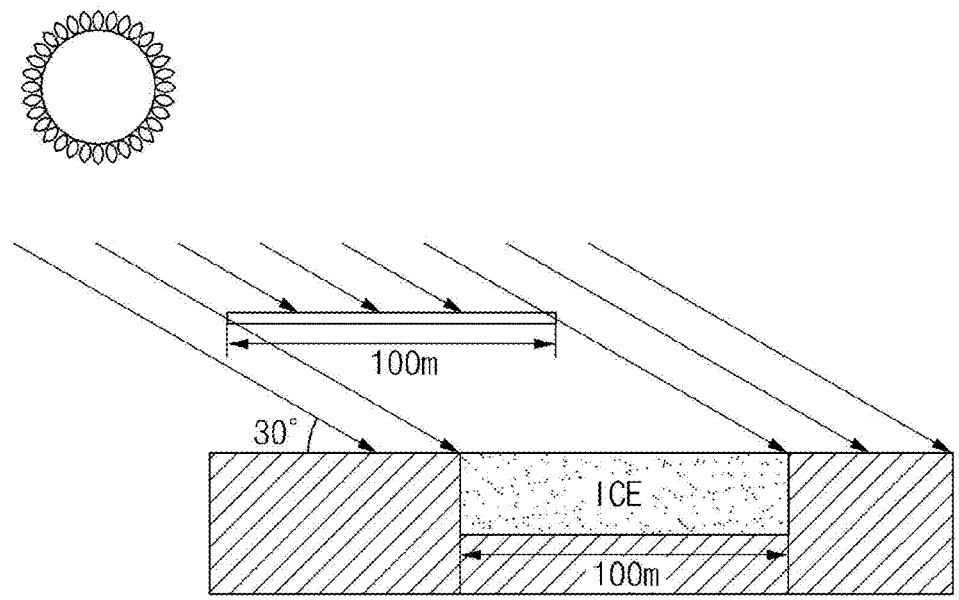
FIG. 1 is a schematic view of a conventional method of controlling a land surface temperature through sunlight blocking.
Figure 2:
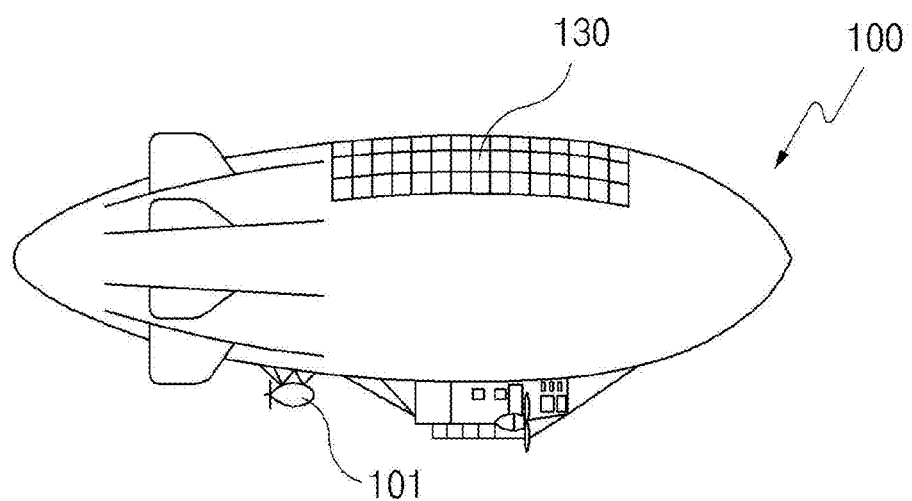
FIGS. 2 and 3 are views showing stratospheric airships and a reflector for achieving a method of controlling a land surface temperature according to an embodiment of the present invention.
Figure 3:
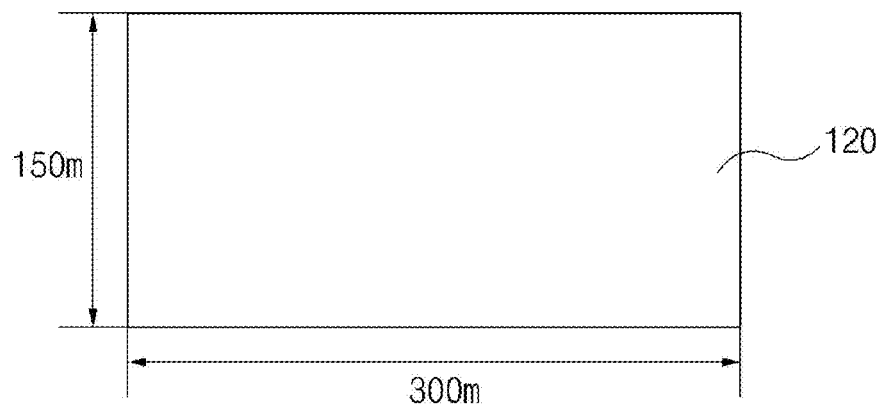
Figure 4:
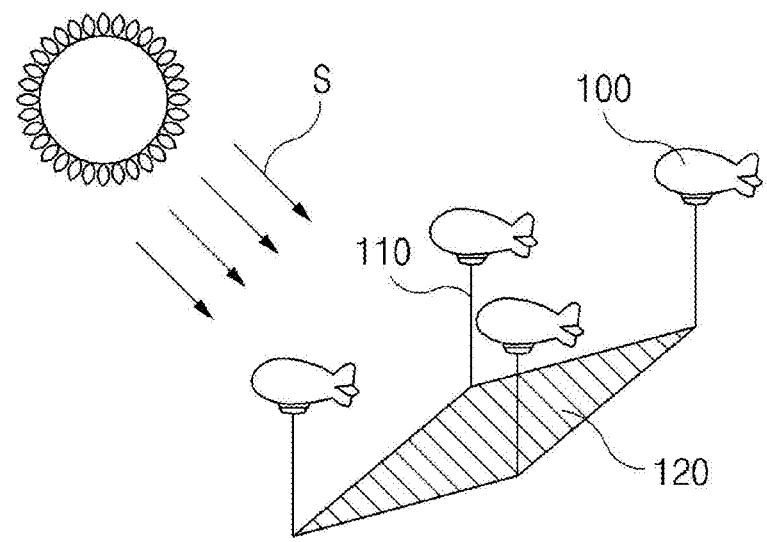
FIG. 4 is a perspective view showing that a tetragonal reflector is unfolded through a plurality of airships in the method of controlling a land surface temperature according to an embodiment of the present invention.

FIGS. 2 and 3 are views showing stratospheric airships and a reflector for achieving a method of controlling a land surface temperature according to an embodiment of the present invention, and FIG. 4 is a perspective view showing that a tetragonal reflector is unfolded through a plurality of airships in the method of controlling a land surface temperature according to an embodiment of the present invention. It is understood that the land surface temperature of a specific land mass may be controlled, where the land mass is a predefined portion of the total land mass of the world, or less than all of the land mass of the world. Land masses which may be controlled range from having areas of 1 $Km^2$ to 1,000 $Km^2$. To control such areas, multiple reflectors 120 may be utilized. Moreover, the land surface temperature may be controlled by dropping the temperature up to about 7 degrees Celsius. In some embodiments, the temperature is dropped by approximately 7 degrees Celsius. Airships 100 may maintain an approximate position of the reflector 120 for a period of time to control the landmass temperature. The period of time may be as long as a customer desires, unless the airships need maintenance or sensors/actuators encounter malfunctions. The period of time may range from one minute to months. In some embodiments, the period of time the airships 100 are controlled to maintain a position of the reflector 120 to reflect sunlight, corresponds to the desired temperature drop (e.g., 7 degrees Celsius), and the period of time may range from a few hours to months.

The inventors have discovered that a simple linear fit model suggests that an increase in global cloud cover of 1 percent corresponds to a global temperature decrease of about 0.07° C. at "high cloud." A simple linear fit model suggests that an increase in global low cloud cover of 1 percent corresponds to a global temperature decrease of about 0.06° C. at "low cloud."

As such, in a case that a landmass is 100% covered or completely covered by a cloud, surface air temperature will decrease by about 7° C. According to some embodiments, although the reflector 120 is used to a significant amount, the area of the reflector 120 is still limited, so it is inevitable to have some radiation energy entering an area shaded by the reflector 120 from a side of the reflector 120 through scattering. However, the diffraction of sun light can be deemed trivial due to the short wave length of solar radiation. Nevertheless, the reflector 120 has a high reflection ratio, so it works much more effectively than clouds.

As an example, if solar radiation of 342 watt/m² enters the atmosphere, clouds may block 77 watt/m² to outer space, and 168 watt/m² may be absorbed by a surface of the land mass. That is, the clouds reflect 22.5% (77/342) of the solar radiation toward outer space.

In contrast, the reflector 120 may reflect 79-86% (solar absorptance of aluminum coating: 0.14-0.21) of solar radiation toward outer space by using aluminum coating, thereby significantly decreasing the amount of solar radiation that is absorbed by the surface of the land mass. The reflection rate of the reflector 120 is clearly much higher than that of clouds. Especially, when the controlled area is wide, the central region of the controlled area could be equivalent to an area that is completely (100%) covered by clouds, so the 7 degrees temperature reduction (the value in connection with the clouds) is achievable.

As explained in the previous paragraphs, since the reflectors 120 are high reflective reflectors (such as those using aluminum coating), the reflectors 120 provide better performance in reducing the absorbed energy into the Earth than the clouds do. Further, solar radiation has a short wave length, so there is not much diffraction of the solar radiation at the side of the reflector 120. This is because diffraction is a weak effect that depends on the wavelength of light. The wavelength of visible light is on the order of hundreds of nanometers. Thus, the main concern would be the radiant energy entering the controlled area through scattering by the particles and vapors in the atmosphere. The controlled area may be somewhat affected by such scattered radiant energy, but the influence becomes insignificant when the controlled area becomes as large as those controlled by the reflectors 120 (i.e., 1 km² to 1000 km²) by having many reflectors 120 aligned to cover the controlled area.

Figure 5:
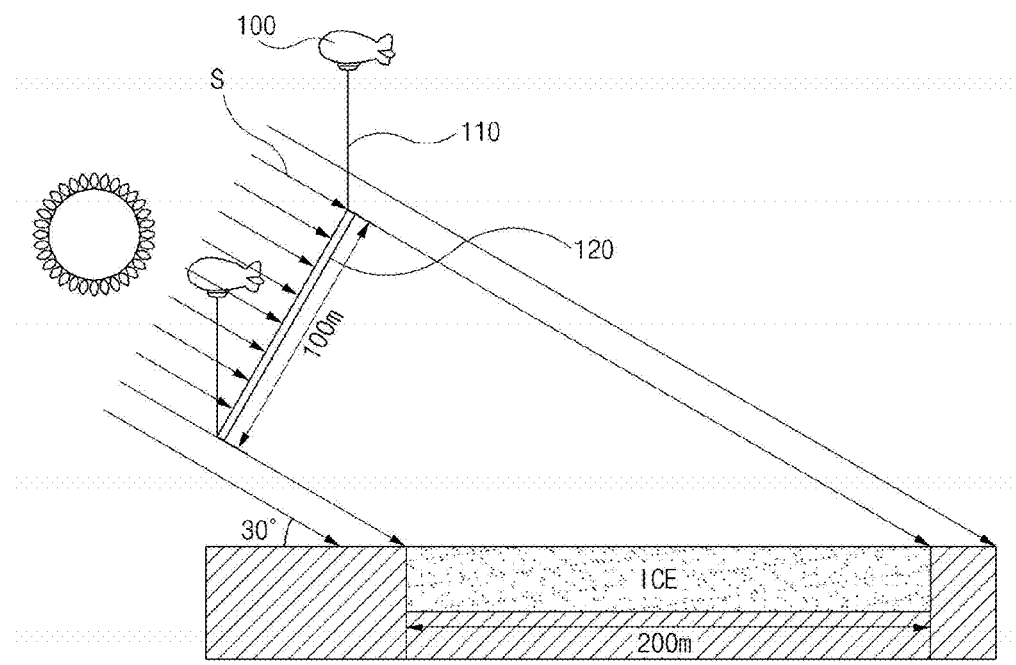
FIG. 5 is a schematic view showing that sunlight is blocked in the method of controlling a land surface temperature according to an embodiment of the present invention.

Also, FIG. 5 is a schematic view showing that sunlight is blocked in the method of controlling a land surface temperature according to an embodiment of the present invention.

As shown therein, a method of controlling a land surface temperature using stratospheric airships and a reflector may include first unfolding a tetragonal reflector 120 as four corners of the tetragonal reflector 120 are supported by lower ends of support lines 110 under the plurality of airships 100 (refer to FIG. 4), in which the reflector 120 is inclined and maintained at an angle perpendicular to an incident angle of sunlight S. Here, the support line 110 is a wire made of metal, nonmetal or the like any material as long as it can support the reflector 120 at the lower end thereof. A control tower may be aware of the position of each airship 100 and makes it possible for the reflector 120 of the airships 100 to be maintained at a desired angle by controlling the propulsion system (e.g., the propelling system 101) of the respective airships 100 to move the airships 100 to desired locations. Since the airships 100 are connected to the reflector 120 via the support lines 110, the reflector 120 may also be accurately positioned through movements of the airships 100. GPS may be used for detecting the position of the airship 100, but for more accurate applications, SBAS (Satellite Based Augmentation System) may be utilized to detect positions of the airships 100 and provides an error range of about 1 m. Since the reflector 120 has a size of 150 m×300 m, an error in a degree of about 1 m may not be a problem in controlling the reflector 100 to be maintained to have the desired angle. Moreover, it may be possible to use GPS-III to determine positions of the airships 100 and control the airships 100. Furthermore, it is expected that the positioning accuracy of GPS will continue to improve, and thereby improve the accuracy of the angle and position of the reflector 120 relative to the sun, as well as positioning of the airships 100.

The airships 100 may be unmanned airships which operate at a high-altitude. The airships 100 may be controlled through the use of automated functions, or through the control of a user. The control of the airships 100 may occur at a location remote to the airships 100, such as at a ground location. For example, a computer at a ground location may adjust the positions of the airships 100 to ensure that the airships 100 remain approximately at specific positions. While the airships 100 may be moved through natural occurrences (e.g., wind), the airships 100 may be controlled to move back into position. As such, while the reflector 120 may be momentarily moved through natural occurrences, the airships 100 may quickly move the reflector 120 back into position, such that any movement by the reflector 120 is for a negligible period of time, and will not significantly affect land surface temperatures. Furthermore, in some embodiments, the ISIS airships may be flown above the jet currents to avoid affects thereof, including wind. Also, the reflector 120 may be used in conjunction with other reflectors 120 (see FIG. 6 and corresponding description for example). These reflectors 120 may be positioned to block sunlight into land areas which overlap. So that if one reflector 120 moves, the other adjacent reflectors 120 still block sunlight into the blocked areas.

Also, when many reflectors 120 are utilized, while the reflectors 120 may move by a margin as discussed above due to natural occurrences, due to the large overall total area of the reflectors 120, the temperature of the land mass may still be controlled. That is, the reflectors 120 may be able to control a land surface temperature of a large land mass. However, a land surface temperature of a specific sized land mass, which has a smaller area than the large land mass, may be selected to be controlled. As such, the reflectors 120 may be positioned to control the land surface temperature of the specific sized land mass, which is less than the total size of the large land mass. The reflectors 120 may be positioned so that the specific sized land mass is away from an outer periphery of a total area shaded by the reflectors 120. Furthermore, the reflectors 120 may be positioned to block light into overlapping portions within the specific sized land mass. Thus, if the reflectors 120 move such that sun reaches the outer periphery; the land surface temperature of the specific sized land mass will not be affected, as the specific sized land mass is away from the outer periphery and will continue to be shaded by the reflectors 120. Thus, the temperature of the specific sized land mass may remain constant as the reflectors 120 are constantly positioned to provide shade (or in some embodiments, redirect light) to the specific sized land mass.

As an example, the reflectors 120 may be able to shade an area of 5000 m×5000 m. An area of 2000 m×2000 m may be selected as a landmass which will have a land surface temperature thereof controlled. The reflectors 120 may be positioned such that the 2000 m×2000 m area is in a center of the 5000 m×5000 m area which is shaded by the reflectors 120 and away from an outer periphery of the 5000 m×5000 m area.

Furthermore, the airships 100 are operated in a region (e.g., 20 km from the surface) that is higher a region affected by jet stream (9-16 km from the surface), so not much turbulence is expected. Airship 100 and line 110 are simply connected to each other, using for example a simple hook and loop system or a fastener such as a screw system with male and female threads. The airship 100 may be equipped with a motor device to control the length of line 110. To maintain a desired angle of the reflector 120, a primary mechanism is the three-dimensional coordination of airships 100, and fine tuning or adjustment of the angle may be performed by an attitude control actuator (used in the satellite position control) (e.g. control momentum gyro, reaction wheel, momentum wheel, magnetic torquer, etc.) which may be additionally installed to the reflector frame, and the accuracy can be improved. That is, a location of the reflector 120 and angle of the reflector 120 may be determined from the attitude control actuator. Moreover, the reflector 120 may include a tracking system, such as at least one GPS, to determine an exact position thereof. For example, several GPSs may be attached at various places on the reflector 120 to determine an angle and position of the reflector 120. If a distance between the GPSs increases, it may be inferred that an angle of the reflector 120 relative to the horizontal decreases, whereas if the distance decreases, it may be inferred that an angle of the reflector 120 relative to the horizontal increases. Whether the reflector 120 maintains the desired angle can be also checked by the attitude control sensor (used in the satellite position control) (e.g. inertia sensor, sun sensor, magnetometer, etc.), and then the position of the airship 100 can be adjusted for a desired accuracy, and fine tuning of the position is performed by attitude control actuator.

Figure 12:
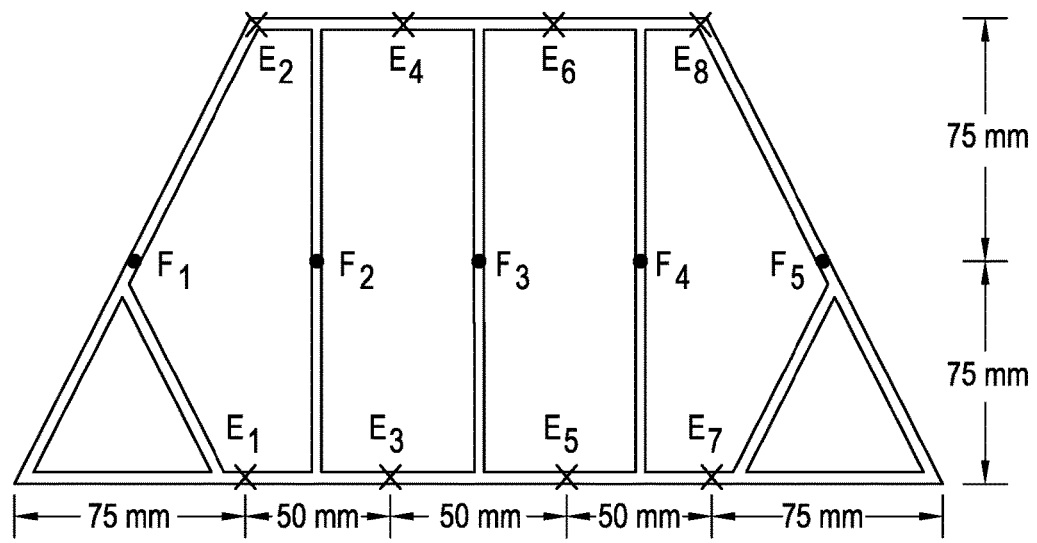
FIG. 12 is a drawing illustrating a main frame of a reflector.

In FIG. 12, a main frame of trapezoid reflector 120 is shown. The reflector 120 would be attached to the main frame, but is omitted for clarity in this figure. If needed, a sub-frame may be added. F1, F2, F3, F4 and F5 are joint portions at which the reflector 120 is folded. E1, E2, E3, E4, E5, E6, E7 and E8 are joint portions which are folded on the ground surface but are unfolded in the stratosphere. A device for unfolding or expanding is the Non-Explosive Actuator (NEA) which is frequently used for expanding a solar cell panel of an artificial mechanical satellite The order to expand/unfold can be made from the ground surface. The drawing shows that it is folded twice, but may also be folded once along the folding line formed collectively by F1, F2, F3, F4 and F5, in lengthwise direction and folded four times in widthwise direction. The reflector 120 is folded four times in the widthwise direction along four folding lines, i.e., a folding line formed by the pair of E1 and E2, folding line formed by the pair of E3 and E4, folding line formed by the pair of E5 and E6, folding line formed by the pair of E7 and E8. The reflector 120 may be folded more as needed. When unfolding the reflector 120, it is possible to move the airships 100 slowly in the unfolding direction so as to facilitate the operation of the NEA. Airships 100 may each include propelling system and may also include airship direction controlling/changing unit made up of a small propulsion unit.

The reflector 120 may be folded in the following order. The F1, F2, F3, F4, and F5 joints are simultaneously folded first, and then the E1 and E2 joints are folded together, and the remaining joints E3-E8 are sequentially folded pair by pair (i.e., the E3 and E4 joints are folded, then the E5 and E6 joints are folded, and then the E8 and E9 joints are folded). When unfolding the reflector 120, the E1 and E2 joints are unfolded at the same time by the NEA, and then the E3 and E4 joints are unfolded, and then other joints are unfolded in the same manner (i.e., the E5 and E6 joints are unfolded, and then the E8 and E9 joints are unfolded). Finally, by simultaneously operating the NEAs which are equipped on F1, F2, F3, F4 and F5, the reflector 120 is completely unfolded.

Figure 13:
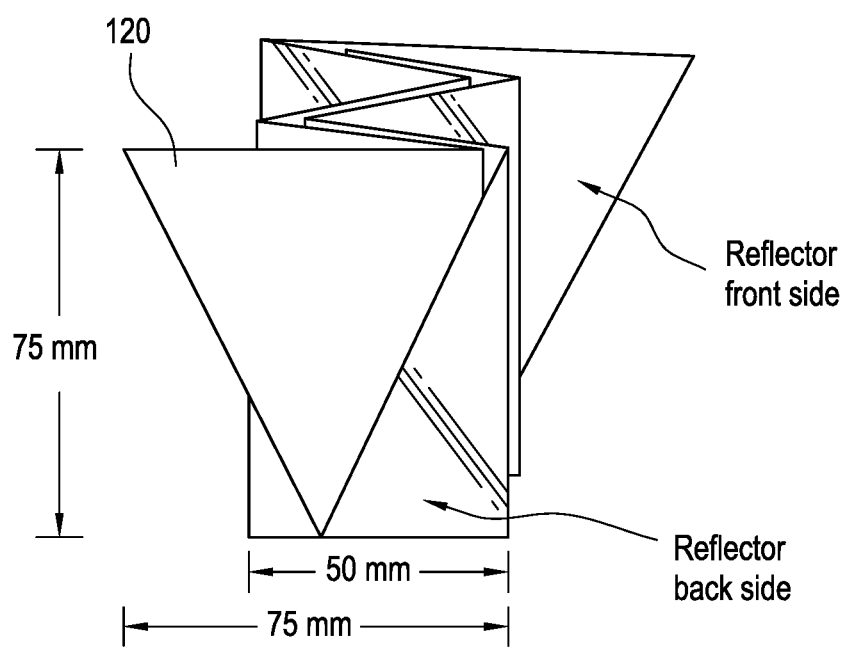
FIG. 13 is a drawing illustrating a reflector.
Figure 14:
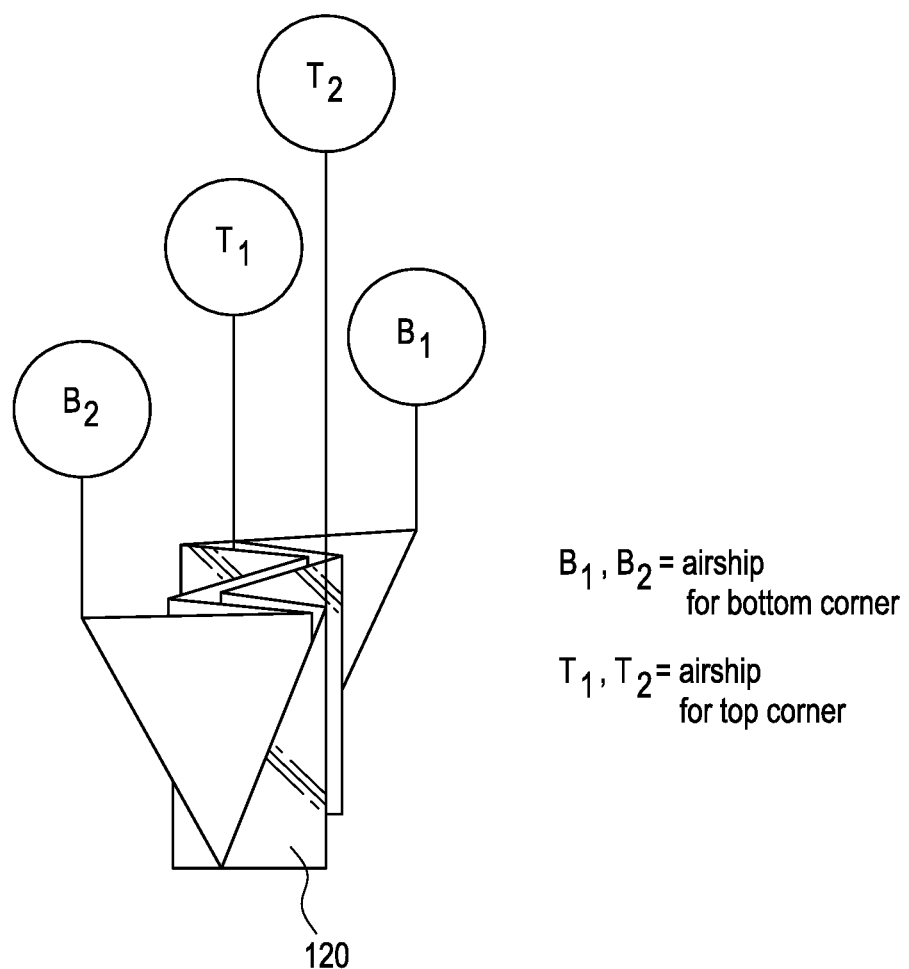
FIG. 14 is a drawing illustrating a reflector and airships.

FIG. 13 illustrates a state in which the trapezoidal reflector 120 is folded. FIG. 14 illustrates how the airships B1, B2, T1, T2, which correspond to airships 100, lift the trapezoidal reflector 120 from the ground. The B1 airship and the B2 airship are in charge of and coupled to the lower longer side of the trapezoidal reflector 120 and they can be located in the same height. The T1 airship and the T2 airship are in charge of the upper short side of the trapezoid, and the T2 airship is located a little bit higher than the T1 airship so as to secure a sufficient space for the T2 airship.

At this time, as shown in FIG. 5, the sunlight S going toward the land surface is reflected from the reflector 120 in a direction opposite to the land surface, so that the sunlight S going toward the land surface can be blocked. Further, the reflecting surface of the reflector 120 is inclined and maintained at an angle perpendicular to the incident angle of the sunlight S, so that a sunlight blocking area in the land surface can be efficiently largely formed.

Meanwhile, the airship 100 for hovering the reflector in the sky can maintain altitude in the stratosphere (20 to 50 km) where a convection current is marginal. To this end, the airship 100 is filled with helium gas and the posture and location of the airship 100 are respectively controlled and moved by a separate propelling system 101.

In addition, a solar cell 130 and a fuel cell as an auxiliary power applying means may be mounted to get the propelling power. Also, the airship may include a global positioning system (GPS) transmitting/receiving device for location control, and a relative angle measurer for adjusting the angle of the reflector in accordance with the location movement.

In current technology, the stratospheric airship includes an integrated sensor is structure (ISIS) airship that has been developed by support of the United States Air Force. The ISIS airship is developed as an airship that can fly at an altitude as high as it is not affected by a jet stream.

The reflector 120 supported by the airships is as shown in FIG. 3 achieved by a large reflector having a length of about 150 m and a breadth of about 300 m.

The reflector 120 may have a frame manufactured by a material having high strength and very lightweight. For example, a carbon fiber or light metal may be used. In addition, a more lightweight material may be applied to the reflector 120. Also, the reflector 120 may be made of nylon or polyester fabric. Further, the reflector 120 may have a surface facing the sunlight, which is coated with a material, such as an aluminum tape capable of reflecting the sunlight. Alternatively, the reflector 120 may be generally configured with a reflective thin fabric, the shape of which is taken by an external proper reinforce material.

Also, if the reflector 120 is as shown in FIG. 5 disposed perpendicularly to the incident angle of the sunlight S, it is possible to block the sunlight by absorbing the sunlight. Therefore, considering the block of the sunlight rather than reflecting efficiency, the reflecting surface may be configured with an inexpensive reflecting surface so that sunlight cannot transmit the reflector 120. It may however be preferable to reflect sunlight for an enhanced performance.

With this configuration, the reflector 120 is folded and coupled to the support line 110 of the airship 100 in the land surface, moved to the stratosphere as the airship 100 flies, and unfolded as the airships 100 are positioned in the stratosphere.

Figure 6:
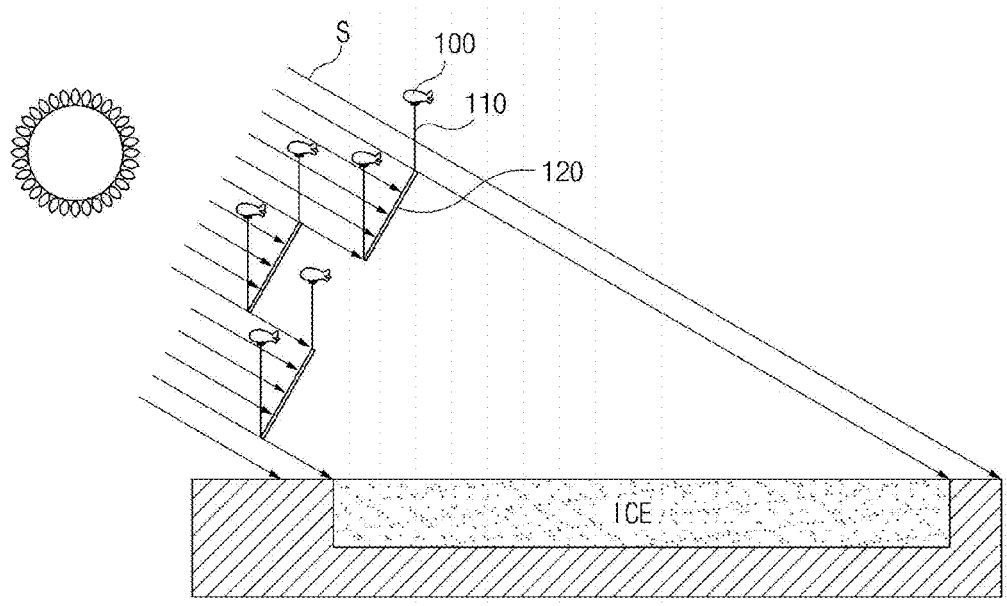
FIG. 6 is a schematic view showing that sunlight is blocked using a plurality of reflectors in the method of controlling a land surface temperature according to an embodiment of the present invention.

FIG. 6 is a schematic view showing that sunlight is blocked using a plurality of reflectors in the method of controlling a land surface temperature according to an embodiment of the present invention. If the area where the sunlight S has to be blocked is large in the land surface, a plurality of reflectors 120 are grouped and positioned flying in the stratosphere, thereby lowering a land surface temperature of a larger area.

Accordingly, the sunlight entering the Arctic and Antarctic poles is blocked while global warming increases, so that the temperature in a certain area can be lowered, thereby preventing the glaciers or the permanent snow from melting.

At this time, the reflector 120 is maintained at an angle perpendicular to the incident angle of the sunlight in order to get an effect of blocking the maximum area on the land surface.

Figure 7:
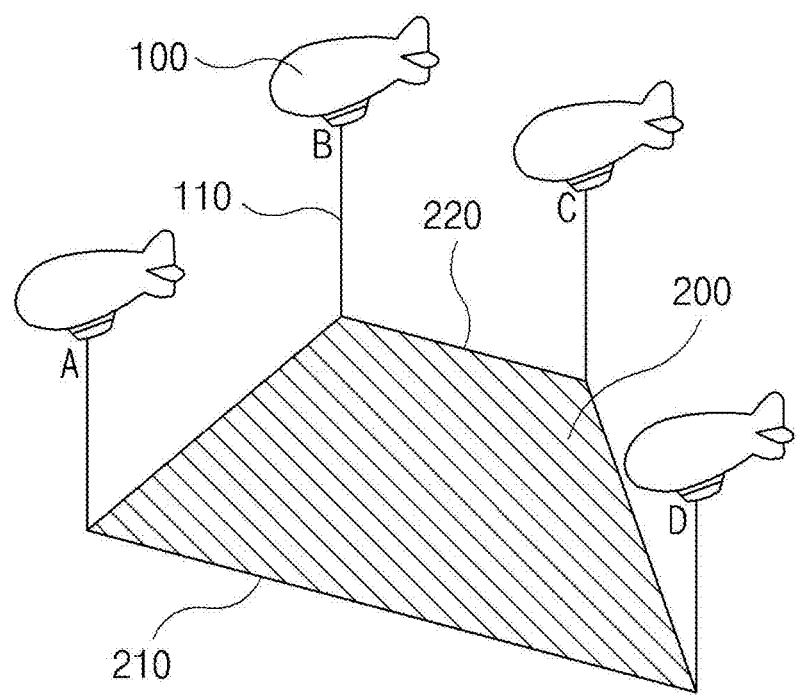
FIG. 7 is a perspective view showing that a trapezoidal reflector is unfolded through a plurality of airships in the method of controlling a land surface temperature according to an embodiment of the present invention.
Figure 8A:
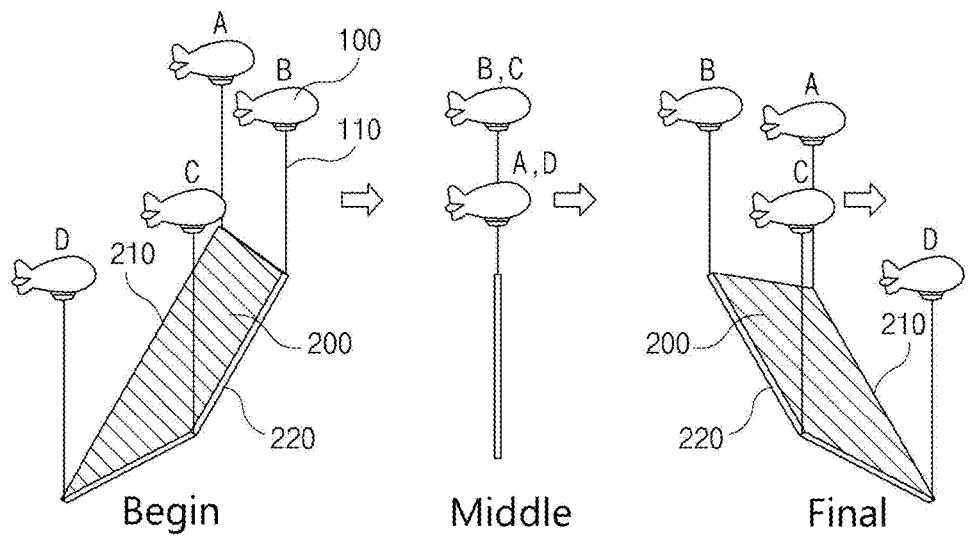
FIGS. 8A and 8B are an exemplary view and a cross-section view showing that an inclination angle of the trapezoidal reflector is controlled.
Figure 8B:
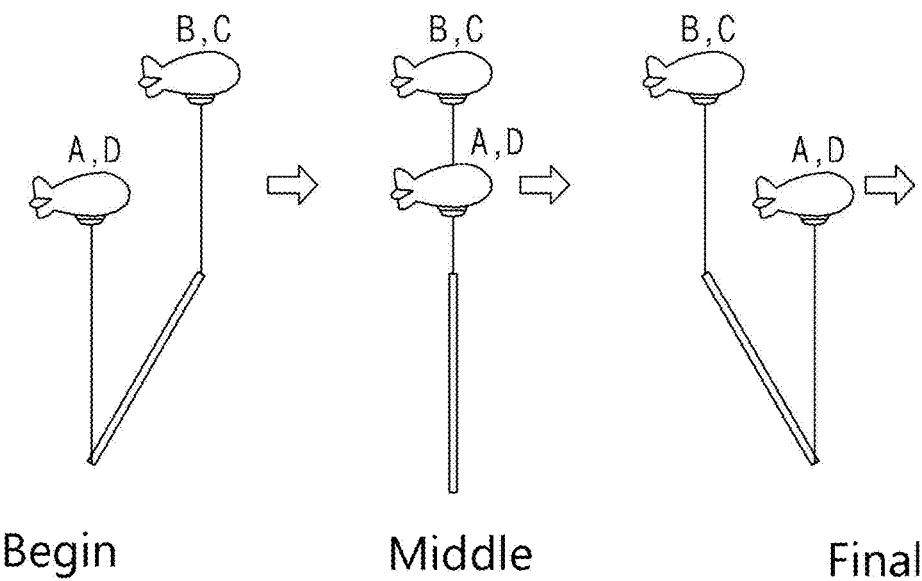
Figure 9:
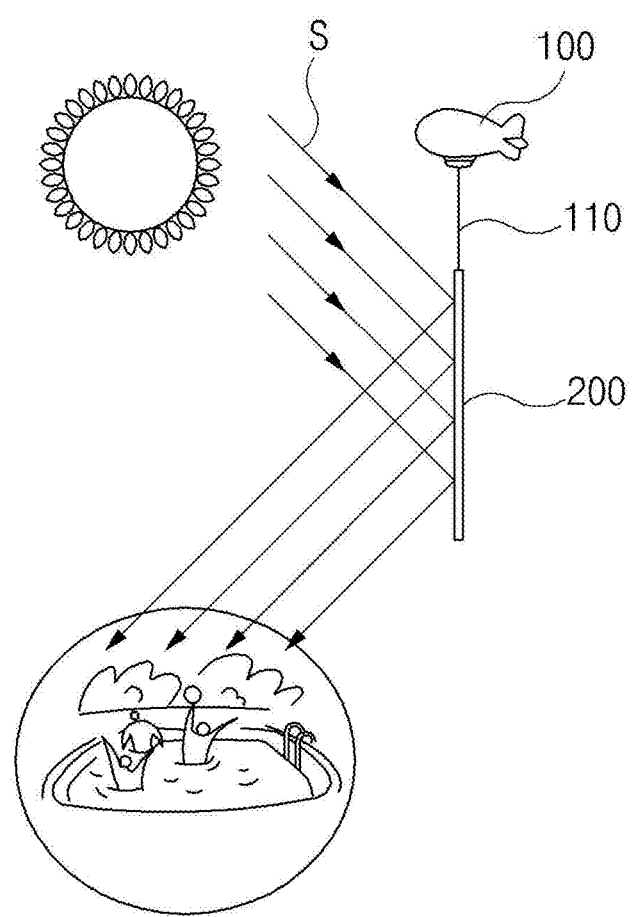
FIG. 9 is a view showing that reflected light of sunlight is introduced into the land surface through the trapezoidal reflector applied to an embodiment of the present invention.

FIG. 7 is a perspective view showing that a trapezoidal reflector is unfolded through a plurality of airships in the method of controlling a land surface temperature according to an embodiment of the present invention, FIGS. 8A and 8B are an exemplary view and a cross-section view showing that an inclination angle of the trapezoidal reflector is controlled, and FIG. 9 is a view showing that reflected light of sunlight is introduced into the land surface through the trapezoidal reflector applied to an embodiment of the present invention. Of course, it is understood that the land surface temperature of a specific land mass may be controlled, where the land mass is a predefined portion of the total land mass of the world, or less than all of the land mass of the world. A range of areas of land masses which may be controlled is 1 Km$^2$ to 1,000 Km$^2$. Moreover, the landmass temperature may be controlled by increasing the temperature in a range of 7 degrees Celsius or less. In some embodiments, the temperature is increased by approximately 7 degrees Celsius. The airships 100 may maintain an approximate position of the reflector 120 for a period of time ranging from a minute to months to control the landmass temperature. In some embodiments, the period of time the airships 100 are controlled to maintain a position to reflect sunlight, corresponds to the desired temperature drop (e.g., 7 degrees Celsius), and the period of time may range from a few hours to months. Moreover, the airships 100 may be controlled as described in the above exemplary embodiments.

As shown therein, in a method of controlling a land surface temperature according to this embodiment of the present invention, a trapezoidal reflector 200 having opposite sides different in length is slantly supported by the support lines 110 under the plurality of airships 100.

The trapezoidal reflector 200 has four corners supported by the support lines 110, and the sunlight S is blocked or introduced through the trapezoidal reflector 200 unfolded in the stratosphere.

The trapezoidal reflector 200 employed in this embodiment is adjustable in angle as shown in FIGS. 8A and 8B by moving the positions of the airships 100 supporting four corners of the reflector 200.

That is, the reflector 200 may block the sunlight entering the land surface or introduce more reflected light of the sunlight into a land surface of a certain area since the inclination angle of the reflector 200 can be adjusted by moving the positions of the airships 100 supporting the corners of the short side 220 and the long side 210 as distances are formed in between the airships A and D supporting the long side 210 and in between the airships B and C supporting the short side 220 while the airships 100 support the corners of the opposite long and short sides 210 and 220.

At this time, the inclination angle of the reflector 200 may be controlled to become a right angle or an obtuse angle with respect to the incident angle of the sunlight S as the pair of airships B and C supporting the corners of the short side 220 intersectionally moves between the pair of airships A and D supporting the corners of the long side 210.

On the other hand, the inclination angle of the reflector 200 may be controlled to become a right angle or an obtuse angle with respect to the incident angle of the sunlight S as the pair of airships A and D supporting the corners of the long side 210 intersectionally moves from the outside of the pair of airships B and C supporting the corners of the short side 210.

Like this, if the inclination angle, at which the reflecting surface of the trapezoidal reflector 200 is disposed, is controlled to become the obtuse angle with respect to the incident angle of the sunlight S as shown in FIG. 9, the sunlight reflected from the reflector 200 is more introduced into a certain area so that temperature can be increased in the area of intense cold or cold wave, thereby improving a living condition. The reflector 200 is formed similarly to the reflector 120 above, and may be controlled as described in the above embodiments. Furthermore, the airships 100 and lines 110 are formed as described in the above embodiments.

Figure 10:
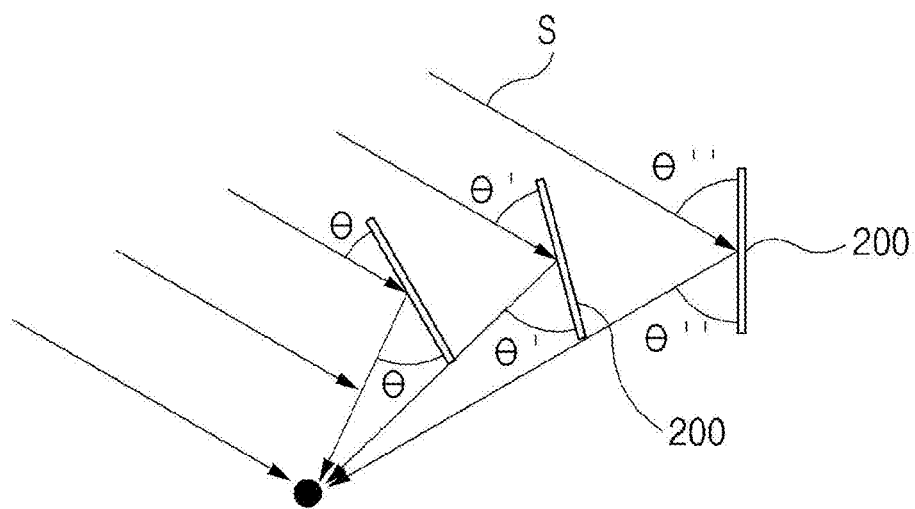
FIGS. 10 and 11 are views showing a method of controlling a land surface temperature according to another embodiment of the present invention, in which many trapezoidal reflectors are used in longitudinal and transverse directions.
Figure 11:
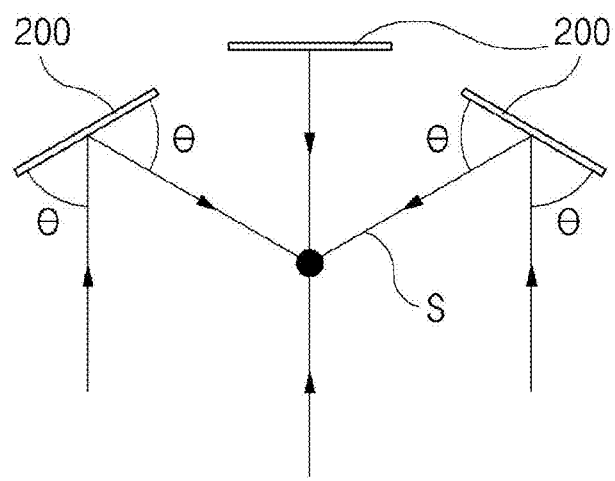

Meanwhile, FIGS. 10 and 11 are views showing a method of controlling a land surface temperature according to another embodiment of the present invention, in which many trapezoidal reflectors are used in longitudinal and transverse directions.

As shown in FIG. 10, in a method of adjusting the land surface temperature according to this embodiment, a plurality of reflectors 200 are grouped in the incident direction of the sunlight S beating down on to the land surface.

In this case, the plurality of reflectors 200 may be installed at different angles with respect to the incident angle of the sunlight S, so that the sunlight reflected from the respective reflectors 200 can be introduced into a certain area, thereby increasing the land surface temperature in the certain area.

Here, FIG. 10 is a lateral view showing that many reflectors are grouped along the longitudinal direction to the sunlight in order to increase the temperature in the certain area (refer to a black circle). In the group of reflectors, a distance between the front reflector and the back reflector may be controlled so that the sunlight of the back reflector cannot be blocked by the front reflector.

Also, as shown in FIG. 11, in a method of controlling the land surface temperature according to this embodiment, a plurality of reflectors 200 may be grouped forming different angles with respect to the incident direction of the sunlight S above the land surface. On the contrary to FIG. 10 (regarding the longitudinal direction), FIG. 11 shows that a plurality of reflectors are installed along a transverse direction to the sunlight in order to increase the temperature in the certain area (refer to a black circle).

In this case, the plurality of reflectors 200 are respectively installed at different angles with respect to the incident direction of the sunlight S, so that the sunlight reflected from each reflector 200 can be introduced into the certain area, thereby increasing the temperature in the certain area.

Although some embodiments have been described herein with reference to the accompanying drawings, it will be understood by those skilled in the art that these embodiments are provided for illustration only, and various modifications, changes, alterations and equivalent embodiments can be made without departing from the scope of the present invention. Therefore, the scope and sprit of the present invention should be defined only by the accompanying claims and equivalents thereof.

The invention claimed is:

1. A method of controlling a land surface temperature of a land surface, the method comprising:
   connecting a plurality of reflectors to support lines so that each of the reflectors has four corners connected to lower ends of the support lines;
   coupling the support lines to a plurality of stratospheric airships;
   unfolding the reflectors in the air with the airships so that each of the reflectors has a trapezoidal shape;
   positioning reflecting surfaces of the reflectors in the stratosphere by using the airships so that the reflecting surfaces are at reflecting positions relative to sunlight so that the reflecting surfaces are each inclined and maintained to block the sunlight from being introduced onto the land surface, wherein the land surface comprises a shaded area of 1 Km$^2$ to 1,000 Km$^2$; and
   reflecting the sunlight with the reflectors while the reflecting surfaces are maintained at the reflecting positions relative to the sunlight by the airships so that the sunlight is blocked from the land surface for a predetermined amount of time such that the land surface temperature is lowered by about 7 degree Celsius or less,
   wherein the unfolding includes moving the airships to be located in the stratosphere by moving the airships to the stratosphere in a state that the reflectors are folded, and when the airships are positioned in the stratosphere, performing the unfolding and the positioning so that the reflectors are unfolded to have the reflecting surfaces be perpendicular to an incident angle of the sunlight.

2. The method according to claim 1, further comprising controlling the airships to have a posture through a propelling system, and the airships comprise a solar cell to get propelling power and a fuel cell for an auxiliary power supply.

3. The method according to claim 1, wherein the reflectors comprise fabric made of nylon or polyester, and further comprises at least one surface coated with a material for reflecting sunlight.

4. The method according to claim 1, wherein the airships include groups of airships, and the plurality of reflectors are each held by a different group of the groups of airships, the groups of airships being positioned so that an area of the land surface, in which the sunlight is blocked, is increased.

5. The method according to claim 1, wherein the support lines comprise a wire.

6. The method according to claim 1, wherein the land surface temperature is lowered by about 7 degree Celsius.

7. A method of reflecting sunlight, comprising:
   connecting a plurality of reflectors to support lines so that each of the reflectors has four corners connected to lower ends of the support lines;
   coupling the support lines to a plurality of stratospheric airships;
   unfolding the reflectors in the air to have a trapezoidal shape and to be slanted with respect to the land surface, wherein the land surface has an area in a range of 1 Km$^2$ to 1,000 Km$^2$;
   reflecting sunlight with reflecting surfaces of the reflectors; and
   positioning the reflecting surfaces of the reflectors in the stratosphere with the airships so as to be inclined with respect to an incident angle of the sunlight so as to introduce reflected light of the sunlight into the land surface,
   wherein
   the reflectors each includes a long side and a short side opposite the long side,
   the positioning includes moving and positioning the airships, which support corners of the long sides and corners of the short sides through the support lines, so that the reflectors introduce the reflected light of the sunlight into the land surface by adjusting an angle of the reflecting surfaces with respect to the incident angle of the sunlight,
   wherein the positioning the reflecting surfaces comprises controlling an inclination angle of the reflectors with respect to the incident angle of the sunlight as a pair of the airships, which supports the corners of the short side of one of the reflectors, intersectionally moves between another pair of the airships supporting the corners of the long side of the one reflector.

8. A method of reflecting sunlight, comprising:
   connecting a plurality of reflectors to support lines so that each of the reflectors has four corners connected to lower ends of the support lines;
   coupling the support lines to a plurality of stratospheric airships;
   unfolding the reflectors in the air to have a trapezoidal shape and to be slanted with respect to the land surface, wherein the land surface has an area in a range of 1 Km$^2$ to 1,000 Km$^2$;
   reflecting sunlight with reflecting surfaces of the reflectors; and
   positioning the reflecting surfaces of the reflectors in the stratosphere with the airships so as to be inclined with respect to an incident angle of the sunlight so as to introduce reflected light of the sunlight into the land surface,
   wherein
   the reflectors each includes a long side and a short side opposite the long side,
   the positioning includes moving and positioning the airships, which support corners of the long sides and corners of the short sides through the support lines, so that the reflectors introduce the reflected light of the sunlight into the land surface by adjusting an angle of the reflecting surfaces with respect to the incident angle of the sunlight,
   wherein the positioning the reflecting surfaces comprises controlling an inclination angle of the reflectors with respect to the incident angle of the sunlight as a pair of the airships, which supports the corners of the long side of one of the reflectors, intersectionally moves from an outside of another pair of the airships supporting the corners of the short side of the one of the reflectors.

9. A method of reflecting sunlight, comprising:
   connecting a plurality of reflectors to support lines so that each of the reflectors has four corners connected to lower ends of the support lines;

coupling the support lines to a plurality of stratospheric airships;

unfolding the reflectors in the air to have a trapezoidal shape and to be slanted with respect to the land surface, wherein the land surface has an area in a range of 1 Km² to 1,000 Km²;

reflecting sunlight with reflecting surfaces of the reflectors; and positioning the reflecting surfaces of the reflectors in the stratosphere with the airships so as to be inclined with respect to an incident angle of the sunlight so as to introduce reflected light of the sunlight into the land surface, wherein the positioning includes positioning the plurality of reflectors at different angles with respect to an incident direction of the sunlight and along the incident direction of the sunlight, and a distance between front and back neighboring reflectors of the reflectors is set up so that reflected light of the back reflector cannot be blocked by the front reflector.

10. A method of reflecting sunlight, comprising:

connecting a plurality of reflectors to support lines so that each of the reflectors has four corners connected to lower ends of the support lines;

coupling the support lines to a plurality of stratospheric airships;

unfolding the reflectors in the air to have a trapezoidal shape and to be slanted with respect to the land surface, wherein the land surface has an area in a range of 1 Km² to 1,000 Km²;

reflecting sunlight with reflecting surfaces of the reflectors; and positioning the reflecting surfaces of the reflectors in the stratosphere with the airships so as to be inclined with respect to an incident angle of the sunlight so as to introduce reflected light of the sunlight into the land surface, wherein the reflectors are grouped at different angles with respect to an incident direction of the sunlight and in a transverse direction with respect to the incident direction of the sunlight.

11. The method according to claim 7, wherein the positioning the reflecting surfaces includes positioning the plurality of reflectors at different angles with respect to an incident direction of the sunlight and along the incident direction of the sunlight, and a distance between front and back neighboring reflectors of the reflectors is set up so that reflected light of the back reflector cannot be blocked by the front reflector.

12. The method according to claim 8, wherein the positioning the reflecting surfaces includes positioning the plurality of reflectors at different angles with respect to an incident direction of the sunlight and along the incident direction of the sunlight, and a distance between front and back neighboring reflectors of the reflectors is set up so that reflected light of the back reflector cannot be blocked by the front reflector.

13. The method according to claim 7, wherein the positioning the reflecting surfaces includes positioning the reflectors to be grouped at different angles with respect to an incident direction of the sunlight and in a transverse direction with respect to the incident direction of the sunlight.

14. The method according to claim 8, wherein the positioning the reflecting surfaces includes positioning the reflectors to be grouped at different angles with respect to an incident direction of the sunlight and in a transverse direction with respect to the incident direction of the sunlight.

* * * * *